Patented Sept. 6, 1938

2,129,615

UNITED STATES PATENT OFFICE 2,129,615

VULCANIZATION OF RUBBER

William C. Calvert, Oak Park, Ill., assignor to Wingfoot Corporation, Wilmington, Del., a corporation of Delaware No Drawing. Application August 3, 1935, Serial No. 34,601

16 Claims. (Cl. 18—53)

This invention relates to a new class of compositions of matter which have been found to be valuable accelerators of the vulcanization of rubber. It includes the compositions themselves, the process of vulcanizing rubber in their presence, and the rubber products so vulcanized. More particularly, it relates to condensation products of aldehydes and ethylene diamines substituted in only one amino group.

These new compositions of matter may be conveniently prepared by condensing with the elimination of water an aldehyde with an ethylene diamine substituted in only one amino group. Generally it will be necessary to reflux the reactants for a period of perhaps thirty minutes and then dry the resulting product by heating to a temperature sufficient to drive off the water formed during the reaction. No catalyst is required for the reaction, although one may be employed if desired.

Generally mol. per mol. proportions of the reactants will be found desirable, although other proportions, such as, for example, that of one mol. of amine to an excess of aldehyde which may be as much as seven mols of aldehyde, may be used. Where an excess of aldehyde is employed, a catalyst such as an acid; e. g., formic, acetic or hydrochloric acid, in an amount of approximately $\frac{1}{10}$% by weight based on the amine, can be used to advantage. Also, the mixture should be refluxed for a period of several hours, for example 8 hours, after which the reaction product is subjected to distillation in order to remove the constituents which boil under 160° C. The residue may be used as an accelerator of vulcanization. An example of such a product is the reaction product of 1 mol. of phenyl ethylene diamine and 7 mols of n-butyraldehyde.

Further illustrative of the invention is the reaction product of ortho tolyl ethylene diamine and crotonaldehyde, which may be prepared by refluxing for 30 minutes a mixture of $\frac{1}{4}$ mol. of ortho tolyl ethylene diamine and $\frac{1}{4}$ mol. of crotonaldehyde. The water formed during the reaction is eliminated from the product by heating it to 150° C. A quantitative yield of a viscous, dark brown oil is obtained.

The condensation product of phenyl ethylene diamine and crotonaldehyde is prepared similarly by refluxing $\frac{1}{4}$ mol. proportions of the diamine and aldehyde for $\frac{1}{2}$ hour and drying the product by heating to 175° C. A viscous, dark brown oil is obtained in a substantially quantitative yield. The condensation product of equimolar proportions of ortho tolyl ethylene diamine and n-butyraldehyde is prepared similarly and is in the form of a thin, light brown oil. The condensation product of equimolar proportions of phenyl ethylene diamine and butyraldehyde is a light brown, limpid oil. Each of these condensation products is soluble in acetone, alcohol and benzene, but insoluble in water.

Other aldehydes which may be employed in the practice of the invention are formaldehyde, acetaldehyde, furfural, benzaldehyde, propionaldehyde, aldol, levulinic aldehyde, alpha ethyl beta propyl acrolein, valeraldehyde, caproic aldehyde, heptaldehyde, cuminic aldehyde, cinnamic aldehyde, etc. Other ethylene diamines substituted in only one amino group which may be employed are para tolyl ethylene diamine, xylyl ethylene diamine, alpha naphthyl ethylene diamine, beta naphthyl ethylene diamine, tetra hydro alpha naphthyl ethylene diamine, tetra hydro beta naphthyl ethylene diamine, butyl ethylene diamine, cyclo hexyl ethylene diamine, penta methylene ethylene diamine, benzyl ethylene diamine, unsymmetrical diphenyl ethylene diamine, unsymmetrical ditolyl ethylene diamine, unsymmetrical N-methyl phenyl ethylene diamine, unsymmetrical ethyl phenyl ethylene diamine, unsymmetrical phenyl alpha naphthyl ethylene diamine, unsymmetrical dicyclo hexyl ethylene diamine, unsymmetrical dibenzyl ethylene diamine, unsymmetrical N-butyl phenyl ethylene diamine, and the like.

These new reaction products are valuable accelerators of vulcanization, having a fairly long curing range and also good antioxidant properties. They may be employed in substantially any of the standard rubber formulae, one found suitable being the following:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Testing data illustrating the use of the accelerators of the invention in the above rubber formulae are as follows:

| Cure | | Ult. tens. kgs/cm² | Max. elong. in percent | Tensile at— | |
|---|---|---|---|---|---|
| Time in mins. | Temp. °F. | | | 500% | 700% |
| *Condensation product of equi-molar proportions of ortho tolyl ethylene diamine and crotonaldehyde* | | | | | |
| 20 | 260 | 85  | 985 | 8  | 20 |
| 30 | 260 | 109 | 930 | 10 | 30 |
| 40 | 260 | 125 | 850 | 16 | 50 |
| 60 | 260 | 154 | 850 | 17 | 64 |
| 80 | 260 | 155 | 805 | 21 | 85 |
| *Condensation product of equi-molar proportions of ortho tolyl ethylene diamine and n-butyraldehyde* | | | | | |
| 20  | 260 | 20  | 975 | 4  | 6  |
| 40  | 260 | 80  | 960 | 8  | 20 |
| 60  | 260 | 108 | 930 | 10 | 30 |
| 80  | 260 | 128 | 850 | 17 | 55 |
| 120 | 260 | 134 | 790 | 20 | 78 |
| *Condensation product of equi-molar proportions of phenyl ethylene diamine and crotonaldehyde* | | | | | |
| 20 | 260 | 50  | 980 | 6  | 12 |
| 30 | 260 | 85  | 970 | 8  | 20 |
| 40 | 260 | 104 | 910 | 11 | 33 |
| 60 | 260 | 143 | 905 | 15 | 45 |
| 80 | 260 | 138 | 865 | 16 | 54 |
| *Condensation product of equi-molar proportions of phenyl ethylene diamine and n-butyraldehyde* | | | | | |
| 20  | 260 | 12  | 960 | 3  | 5  |
| 40  | 260 | 67  | 875 | 10 | 26 |
| 60  | 260 | 102 | 930 | 11 | 30 |
| 80  | 260 | 110 | 870 | 14 | 42 |
| 120 | 260 | 127 | 805 | 20 | 70 |

The accelerators of this invention were also tested for their resistance to ageing, the following results being obtained on samples made up in accordance with the above formula, vulcanized and aged in an oxygen bomb for 6 days at 50° C. and 150 lbs./sq. in. oxygen pressure:

| Cure | | Ult. tens. kgs/cm² | Max. elg. | Tensile at— | | Percent weight increase |
|---|---|---|---|---|---|---|
| Time in Mins. | Temp. °F. | | | 500% | 700% | |
| *Condensation product of equi-molar proportions of ortho tolyl ethylene diamine and crotonaldehyde* | | | | | | |
| 20 | 260 | 84  | 915 | 10 | 18  | .12 |
| 30 | 260 | 104 | 825 | 16 | 52  | .13 |
| 40 | 260 | 127 | 825 | 18 | 62  | .04 |
| 60 | 260 | 140 | 785 | 22 | 85  | .18 |
| 80 | 260 | 142 | 760 | 25 | 100 | .27 |
| *Condensation product of equi-molar proportions of ortho tolyl ethylene diamine and n-butyraldehyde* | | | | | | |
| 20  | 260 | 32  | 950 | 6  | 10 | .14 |
| 40  | 260 | 76  | 925 | 10 | 25 | .18 |
| 60  | 260 | 92  | 860 | 12 | 38 | .17 |
| 80  | 260 | 107 | 800 | 18 | 60 | .20 |
| 120 | 260 | 110 | 750 | 13 | 84 | .46 |
| *Condensation product of equi-molar proportions of phenyl ethylene diamine and crotonaldehyde* | | | | | | |
| 20 | 260 | 64  | 990 | 7  | 14 | .10 |
| 30 | 260 | 84  | 915 | 10 | 28 | .10 |
| 40 | 260 | 97  | 870 | 14 | 40 | .11 |
| 60 | 260 | 122 | 830 | 17 | 60 | .13 |
| 80 | 260 | 136 | 825 | 18 | 66 | .15 |
| *Condensation product of equi-molar proportions of phenyl ethylene diamine and n-butyraldehyde* | | | | | | |
| 20  | 260 | 18  | 950 | 4  | 7  | 0.10 |
| 40  | 260 | 73  | 920 | 9  | 23 | .09 |
| 60  | 260 | 95  | 825 | 18 | 48 | .12 |
| 80  | 260 | 110 | 815 | 17 | 56 | .13 |
| 120 | 260 | 130 | 830 | 18 | 62 | .21 |

As illustrated by the foregoing data, the compounds of the invention are excellent long range accelerators and, in addition, have valuable age-resisting properties. With the exception of the formaldehyde reaction product of ethylene diamines substituted in only one amino group, the products are ordinarily oils and, therefore, may be easily incorporated in rubber.

The details of the invention as herein set forth may be varied within wide limits without departing from the spirit of the invention. It will, accordingly, be understood that it is desired to embrace within the scope of this invention such modifications and changes as may be necessary to adapt it to varying conditions and uses. It is intended that the patent shall cover, by suitable expression in the appended claims, whatever features of patentable novelty reside in the invention.

What I claim is:

1. The process of vulcanizing rubber which comprises subjecting it to vulcanization in the presence of a condensation product of an aliphatic aldehyde and an ethylene diamine substituted in only one amino group and therein by at least one hydrocarbon radical.

2. The process of vulcanizing rubber which comprises subjecting it to vulcanization in the presence of a condensation product of an aliphatic aldehyde and an ethylene diamine substituted in only one amino group and therein by at least one aryl hydrocarbon radical of the benzene and naphthalene series.

3. The process of vulcanizing rubber which comprises subjecting it to vulcanization in the presence of a condensation product of ortho tolyl ethylene diamine and crotonaldehyde.

4. The process of vulcanizing rubber which comprises subjecting it to vulcanization in the presence of a condensation product of ortho tolyl ethylene diamine and an aldehyde.

5. The process of vulcanizing rubber which comprises subjecting it to vulcanization in the presence of phenyl ethylene diamine and butyraldehyde.

6. The process of vulcanizing rubber which comprises subjecting it to vulcanization in the presence of a condensation product of an aliphatic aldehyde and an ethylene diamine substituted in only one amino group and therein by a phenyl radical.

7. The process of vulcanizing rubber which comprises subjecting it to vulcanization in the presence of a condensation product of an aliphatic aldehyde and an ethylene diamine substituted in only one amino group and therein by a phenyl radical, said amine and aldehyde having been reacted in substantially equimolar proportions.

8. The process of vulcanizing rubber which comprises subjecting it to vulcanization in the presence of a condensation product of an aldehyde and a compound of the formula $$RNH-CH_2CH_2NH_2,$$

wherein R is a hydrocarbon radical.

9. The process of vulcanizing rubber which comprises subjecting it to vulcanization in the presence of a condensation product of an aliphatic aldehyde and a compound of the formula $RNH-CH_2CH_2NH_2$, wherein R is an aryl hydrocarbon radical of the benzene and naphthalene series.

10. A rubber product which has been vulcanized in the presence of a condensation product of an aldehyde and an ethylene diamine substituted in only one amino group and therein by at least one hydrocarbon radical.

11. A rubber product which has been vulcanized in the presence of the condensation product of ortho tolyl ethylene diamine and crotonaldehyde.

12. A rubber product which has been vulcanized in the presence of a condensation product of a phenyl ethylene diamine and an aliphatic aldehyde.

13. The condensation product of ortho tolyl ethylene diamine and crotonaldehyde.

14. The condensation product of an aliphatic aldehyde and an ethylene diamine substituted in only one amino group and therein by at least one aryl hydrocarbon radical of the benzene and naphthalene series.

15. The condensation product of an aliphatic aldehyde and an ethylene diamine substituted in only one amino group and therein by at least one aryl hydrocarbon radical of the benzene and naphthalene series, said aldehyde and diamine having been reacted in substantially equi-molar proportions.

16. The process of vulcanizing rubber which comprises subjecting it to vulcanization in the presence of a condensation product of an aldehyde and an ethylene diamine substituted in only one amino group and therein by at least one hydrocarbon radical.

WILLIAM C. CALVERT.